Dec. 20, 1927.
W. GRIMLEY
SYRINGE OR SPRAYER
Filed Dec. 29, 1924
1,653,562
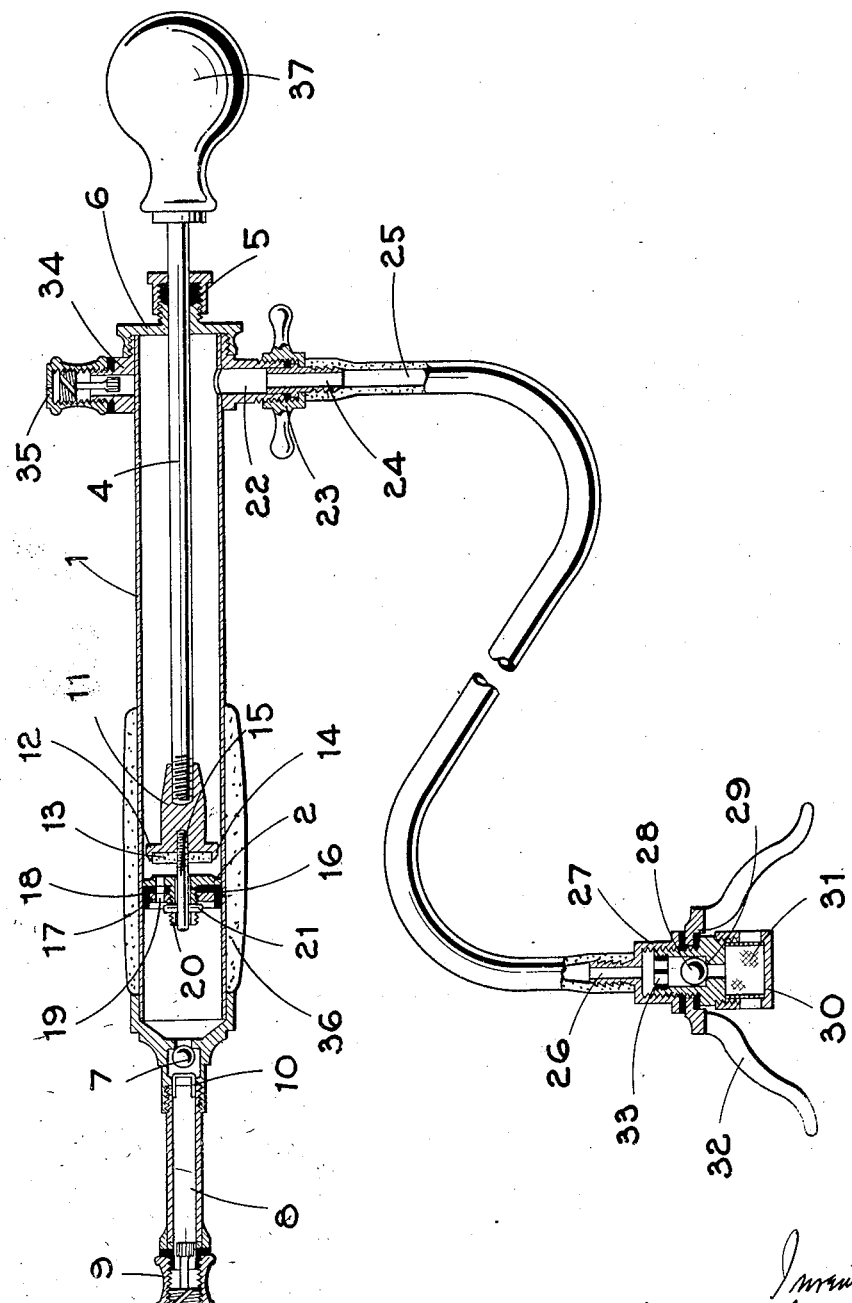

Patented Dec. 20, 1927.

1,653,562

UNITED STATES PATENT OFFICE.

WILLIAM GRIMLEY, OF SMETHWICK, ENGLAND.

SYRINGE OR SPRAYER.

Application filed December 29, 1924, Serial No. 758,741, and in Great Britain January 4, 1924.

This invention relates to a new or improved construction of syringes and sprayers such as are used in gardening and horticulture. The invention is also applicable to syringes and sprayers which are to be used for other purposes.

The primary object of this invention is to provide an improved combination and arrangement of valves and parts in general which will not only ensure a positive and reliable action, but will enable the several parts to be constructed easily and cheaply, and also in a manner allowing of the renewal of those parts liable to become worn after prolonged use. Further objects of this invention are to construct the apparatus so that it can be used with the greatest convenience and comfort and also so that it is not liable to become stopped up or choked when used with liquids liable to contain solid matter.

Further advantages of this invention will be apparent from the following description of the accompanying drawing illustrating a particular embodiment of my invention in section.

In the construction illustrated by the accompanying drawing, the apparatus comprises a cylinder 1 having a piston 2 and a piston rod 4 passing out through a stuffing box 5 in the cylinder cover 6.

At its forward end the cylinder 1 is provided with a cap having a through discharge passage in which is fitted a non-return ball valve 7. This passage is continued for a substantial length by means of a tube 8 in order to enable the user to have a wider range of action.

The tube 8 is provided at its forward end with a nozzle member 9 which may be of any suitable construction and may be in the form of a central jet or it may be in the form of a rose or spray. The nozzle is preferably detachably connected to the tube 8 so that it may be quickly removed and a nozzle of different form substituted, as required.

The non-return ball valve 7 is prevented from passing into the tube 8 by an abutment member which in the construction shown is in the form of a U shaped piece of wire 10 which is soldered or otherwise secured in position across the mouth of the tube adjacent the ball.

The piston rod 4 is provided with an extension or enlarged shank-like portion 11 at its forward end which is formed separately from the piston rod and is screwed into engagement therewith. Formed integral with the member 11 is a disc-like head 12 which is of less diameter than the internal diameter of the cylinder 1, to allow the liquid to flow past its outer edge. Upon the front face of the head portion 12 is a washer or valve member 13 of rubber or any other suitable material which is retained in position by the flanged over edges 14 of the part 12. Screwing into the end of the member 11 is a short rod 15 upon which is slidably mounted the piston proper 2. The piston 2 comprises a disc-like member having a forwardly extending screw-threaded shank portion 16, a disc 17 of slightly less diameter mounted upon the screw-threaded shank and a cup washer 18 mounted in position between the two discs 2 and 17. Passing through the piston 2, through the disc 17 and also through the cup washer 18 are a number of holes 19. The forward end of the screwthreaded shank 16 is provided with a pair of oppositely disposed slots 20 through which the ends of a pin 21 pass, the pin being secured within a hole in the rod 15. By the pin 21 engaging in the slots 20, the piston is allowed a limited amount of sliding movement, so that when the piston rod is pushed in one direction the valve member 13 positively closes the holes 19 by engagement with their ends on the face of the piston.

At the rear of the cylinder 1 a liquid inlet pipe 22 is provided. The end of this pipe 22 is screw threaded and screwing upon the exterior of this pipe is a two-armed union nut 23 which serves to detachably retain a short tube 24. This tube 24 carries a length of flexible rubber hose or the like 25. This rubber hose 25 may be of any suitable length. The opposite end of the hose is connected to a nipple 26 upon a casing 27 surrounding a non-return ball valve 28 mounted in position upon a seating 29. The casing is provided at its lower end with a cylindrical cap 30 having lateral perforations and a cylindrical wire gauge or the like filter 31. Arranged radially around the cage member 27 are a number of legs 32 (three being a suitable number) which serve to space the lower part of the cage away from the bottom of the liquid container or pail and above any sediment which may have collected therein, and also serve to retain the ball valve in a position in which it can fall by gravity on to its seat. Arranged above the ball valve but spaced away therefrom is a perforated guard member 33 to prevent the ball from being displaced.

Secured upon the cylinder 1 at the rear is a lug or projection 34 which is screw threaded and adapted to carry a spare nozzle member 35. At its forward end the cylinder is provided with a hand grip 36 of celluloid, rubber composition or the like which extends around its periphery and the piston rod is provided with an enlarged handle portion 37 which, if desired, may be of similar material.

Alternatively, the valve casing may be mounted upon a float so that the inlet end of the hose receives the liquid from near its surface. If a float is not used, the casing is provided with the downwardly projecting feet so that the inlet to the valve casing or to the hose will never sink into sediment.

Claims—

1. A syringe or sprayer comprising in combination a cylinder, a fluid inlet to the cylinder located near one end of the cylinder, a casing connected to said inlet by a flexible pipe and adapted to be placed in any suitable reservoir, a non-return valve within said casing, a cylindrical cap having lateral perforations attached to the lower end of said casing, said perforations being covered by a filter, legs on said casing adapted to space the lower part of said perforated cap away from the bottom of the reservoir in which it is placed, a valve controlled fluid outlet at the other end of said cylinder, a solid piston rod, an extension attached to the inner end of said piston rod and having an integral disc-like recessed head, a flexible washer mounted in said recess, a bearing pin secured centrally in said head and projecting therefrom, a piston of larger diameter than said head, slidably mounted on said pin, said piston comprising a disc having a central externally screw threaded hollow shank adapted to slide on said pin, a flexible cup washer mounted on said shank and clamped in its working position between a plate screwed on to said shank and said disc, the said disc, cup washer and plate having registering holes therein for the passage of fluid, and a transverse pin in the end of the said bearing pin adapted to work in a slot in the shank of said disc.

2. A syringe or sprayer comprising in combination a cylinder, a valve controlled fluid inlet at one end of said cylinder, an outlet at the other end of the cylinder, a cap on the delivery end of the cylinder having a through passage and a non-return valve, a tubular extension of substantial length carried by said cap, a removable nozzle on said tubular extension, a solid piston rod, an extension attached to the inner end of said piston rod and having an integral disc-like recessed head, a flexible washer mounted in said recess, a bearing pin secured centrally in said head and projecting therefrom, a piston of larger diameter than said head, slidably mounted on said pin, said piston comprising a disc having a central externally screw threaded hollow shank adapted to slide on said pin, a flexible cup washer mounted on said shank and clamped in its working position between a plate screwed on to said shank and said disc, the said disc, cup washer and plate having registering holes therein for the passage of fluid, and a transverse pin in the end of the said bearing pin adapted to work in a slot in the shank of said disc.

3. A syringe or sprayer comprising in combination a cylinder, a fluid inlet to the cylinder located near one end of the cylinder, a casing connected to said inlet by a flexible pipe and adapted to be placed in any suitable reservoir, a non-return valve within said casing, a cylindrical cap having lateral perforations attached to the lower end of said casing, said perforations being covered by a filter, legs on said casing adapted to space the lower part of said perforated cap away from the bottom of the reservoir in which it is placed, an outlet at the other end of the cylinder, a cap on the delivery end of the cylinder having a through passage and a non-return valve, a tubular extension of substantial length carried by said cap, a removable nozzle on said tubular extension, a solid piston rod, an extension attached to the inner end of said piston rod and having an integral disc-like recessed head, a flexible washer mounted in said recess, a bearing pin secured centrally in said head and projecting therefrom, a piston of larger diameter than said head, slidably mounted on said pin, said piston comprising a disc having a central externally screw threaded hollow shank adapted to slide on said pin, a flexible cup washer mounted on said shank and clamped in its working position between a plate screwed on to said shank and said disc, the said disc, cup washer and plate having registering holes therein for the passage of the fluid, and a transverse pin in the end of the said bearing pin adapted to work in a slot in the shank of said disc.

In witness whereof I affix my signature.

WILLIAM GRIMLEY.